United States Patent
Boe et al.

(10) Patent No.: US 6,932,559 B2
(45) Date of Patent: Aug. 23, 2005

(54) CATALYST LOADING METHOD AND APPARATUS

(75) Inventors: Michael Boe, Klampenborg (DK); Niels Erikstrup, Frederiksberg (DK)

(73) Assignee: Haldor Topsoe A/S, Lyngby (DK)

( * ) Notice: Subject to any disclaimer, the term of this patent is extended or adjusted under 35 U.S.C. 154(b) by 325 days.

(21) Appl. No.: 10/193,169

(22) Filed: Jul. 12, 2002

(65) Prior Publication Data

US 2003/0031536 A1 Feb. 13, 2003

(30) Foreign Application Priority Data

Aug. 7, 2001 (DK) ........................................ 2001 01184

(51) Int. Cl.[7] .............................................. B65B 1/06
(52) U.S. Cl. ..................................... 414/808; 414/160
(58) Field of Search ................................ 414/160, 147, 414/146, 808; 193/30

(56) References Cited

U.S. PATENT DOCUMENTS

| | | | | |
|---|---|---|---|---|
| 436,029 A | * | 9/1890 | Vestrout | 414/160 |
| 3,608,751 A | | 9/1971 | Hundtofte | |
| 3,926,290 A | * | 12/1975 | Isojima | 193/30 |
| 4,138,021 A | | 2/1979 | McKenzie | |
| 6,132,157 A | * | 10/2000 | Comardo | 414/160 |

FOREIGN PATENT DOCUMENTS

| | | |
|---|---|---|
| DE | 246670 | 6/1987 |
| EP | 0 548 999 | 6/1993 |
| FR | 2 789 050 | 8/2000 |
| GB | 2 070 576 | 9/1981 |
| JP | 53-21086 | 2/1978 |
| WO | WO 97/37911 | 10/1997 |

\* cited by examiner

Primary Examiner—Eileen D. Lillis
Assistant Examiner—Charles A. Fox
(74) Attorney, Agent, or Firm—Dickstein Shapiro Morin & Oshinsky LLP

(57) ABSTRACT

A method of loading particulate catalytic material into a reactor tube and a loading apparatus for use in the method. The method comprises providing a loading tube through which catalyst particles pass in a damped motion. The damped motion is provided by mounting a spirally formed body on the inner wall of each loading tube section. The spirally formed body is formed from a rod having an arbitrarily shaped cross-section and a maximum dimension in any direction of the cross-section of ¹⁄₂₅–½ of the diameter of the loading tube section. The spirally formed body in each section has a pitch, with respect to the diameter of the loading tube section, in the interval of 2–8.

3 Claims, 3 Drawing Sheets

CATALYST LOADING METHOD AND APPARATUS

The invention concerns a method and an apparatus for loading particulate material in reactor tubes. More particularly, the invention relates to loading of particulate, catalytic material in reactor tubes such as tubular steam reformers being employed in ammonia, hydrogen and methanol plants.

Loading of particulate, catalytic material in tubular reactors is conventionally performed using the sock method. With this method, an elongated, sock-like member made of a flexible plastic material is filled with catalyst particles, and lowered into the reactor tube with the aid of a line to which the sock is attached. On reaching the bottom of the reactor, the line is jerked, thus opening the sock and releasing the particles into the reactor.

When using this method, uneven and inhomogeneous loading of the reactor results in voids due to particle crushing by premature sock opening or in the formation of bridges by the particles. Void formation is undesirable because it leads to uneven temperature distribution and variations in pressure drop in the reactor. The voids can be partially removed by striking or hammering the sides of the reactor tube, causing the reactor walls to vibrate. However, this process is labour-intensive and time-consuming.

U.S. Pat. No. 5,247,979, which is incorporated herein by reference, describes a method for filling particulate material into a vertical tube using a line with a damper in the form of a series of flexible, damper brushes arranged transversely to the line. The line with damper brushes is first lowered into the vertical tube, and then the particles are poured into the tube. It is stated that quick, even and reproducible filling is attained if the line is jerked a little during the filling operation, while simultaneously being lifted up gradually as the tube is filled.

This method, however, has several disadvantages. The falling distance of the particles from the brushes to the bottom of the tube is not under control, and the particles can also become wedged in-between the brushes and the walls of the tube, rendering the apparatus immobile in the tube. The radial distance of the brushes from the line to the walls of the tube has to correspond to the tube diameter, which means each specific tube requires its own line with brushes.

The above-mentioned disadvantages and others associated with the various methods are solved by the method and apparatus of the invention, as will be apparent in the following.

SUMMARY OF THE INVENTION

It is therefore an object of the invention to provide a method and an apparatus for filling particulate, catalytic material in reactor tubes such as tubular steam reformers to ensure a high catalyst density thus minimising voids and bridging of the catalyst particles.

It is also an object of the invention to provide a loading apparatus applicable to all common catalyst types and sizes resulting in optimal loading densities with both narrow and wide tube diameters.

It is a further object to provide a loading method which is highly automated, and therefore reduces the possibility of human errors and risk of reloading of reactor tubes.

Finally, it is an object of the invention to provide an apparatus whereby a uniform pressure drop and uniform flow across the reactor tubes of for instance reformers is obtained, resulting in a reduced tendency to hot spot formation and a longer tube life.

The above objects are achieved by the invention, which provides a method of loading particulate catalytic material into a reactor tube, comprising providing a loading tube by connecting a number of tube sections having an outer diameter smaller than the inner diameter of the reactor tube, to a final tube length corresponding to the length of the reactor tube; introducing at the top of the loading tube a quantity of the catalyst particles to be loaded into the reactor tube, causing the catalyst particles to pass through the loading tube in a damped motion by providing dampening means within the loading tube; and successively withdrawing the loading tube from the reactor tube in a length corresponding to the loading height of the catalyst particles loaded into the reactor tube, wherein the dampening means are provided by mounting a spirally formed body on the inner wall of each tube section, the spirally formed body being formed from a rod having an arbitrarily shaped cross-section and a maximum dimension in any direction of the cross-section of $\frac{1}{25}-\frac{1}{2}$ of the diameter of the tube section, the spirally formed body in each section having a pitch, with respect to the diameter of the tube section, in the interval of 2–8.

The invention further provides a loading apparatus being useful in the above loading method.

The loading apparatus according to the invention comprises a loading tube having a tube diameter to fit into a reactor tube; a top part of the loading tube being adapted to be connected to a funnel unit and a bottom part of the loading tube being provided with lifting means for withdrawal of the loading tube from the reactor tube; the loading tube consisting of separate tube sections each provided with connecting means adapted to be assembled to the loading tube when connected to each other; at least one of the tube sections being provided with dampening means to decelerate the speed of catalyst particles being passed through the loading tube, wherein the dampening means are provided by mounting a spirally formed body on the inner wall of each tube section, the spirally formed body being formed from a rod having an arbitrarily shaped cross-section and a maximum dimension in any direction of the cross-section of $\frac{1}{25}-\frac{1}{2}$ of the diameter of the tube section, the spirally formed body in each section having a pitch, with respect to the diameter of the tube section, in the interval of 2–8.

As disclosed above, the loading apparatus consists of a number of tube sections. The tube sections can be assembled and inserted in a reactor tube such as a tubular reformer to form one long loading tube. In a specific embodiment of the invention each of the sections is provided with a damper in form of a spirally formed body fixed to the inner wall of the tube section.

The connecting means used to assemble the separate tube sections to the final loading tube are preferably in form of a sliding member arranged on the outer wall of one end of a tube section. The ends of the tube sections are typically provided with notches fitting into one another in an interlocking manner.

When catalyst particles are loaded through the loading tube, the speed of the catalyst particles is reduced as the catalyst descends in a spiral movement on the spirally formed body. The helical movement forces the particles to align along the spiral assuring that the particles arrive one by one and not in lumps. At the bottom of the loading tube, the catalyst particles have the same speed, and fall a short, pre-defined distance. The result is uniform dense loading with no bridging, voids or broken catalyst particles.

DETAILED DESCRIPTION OF THE INVENTION

With the method according to the invention, the risk of crushing of catalyst particles dropped from too high a height is eliminated. A skilled loading crew will also be able to perform the loading job significantly faster than with the conventional loading using for example the sock method.

A high uniform loading density is obtained by the method without hammering on the reactor tubes.

A uniform pressure drop and thus uniform flow across the reactor tubes is also obtained. The result is a reduced tendency to hot spot formation and a longer tube life.

The apparatus of the invention consists of a number of equally sized tube sections with a spirally formed body fixed on the inner walls. The tube sections can be connected and inserted in the reformer tubes to form one long loading tube, as apparent from the following description with reference to the drawings.

Figure 1:
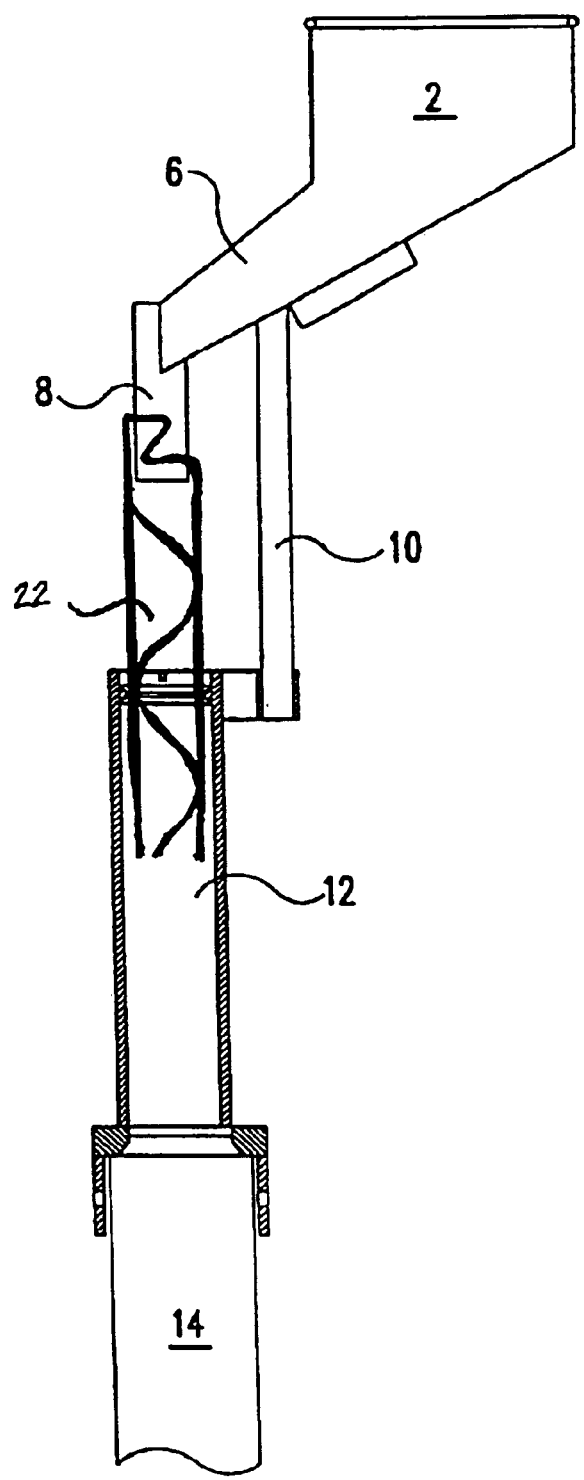
FIG. 1 shows an apparatus according to a specific embodiment of the invention applied in a set-up ready for loading of particulate catalyst material into a reactor tube.
Figure 2:
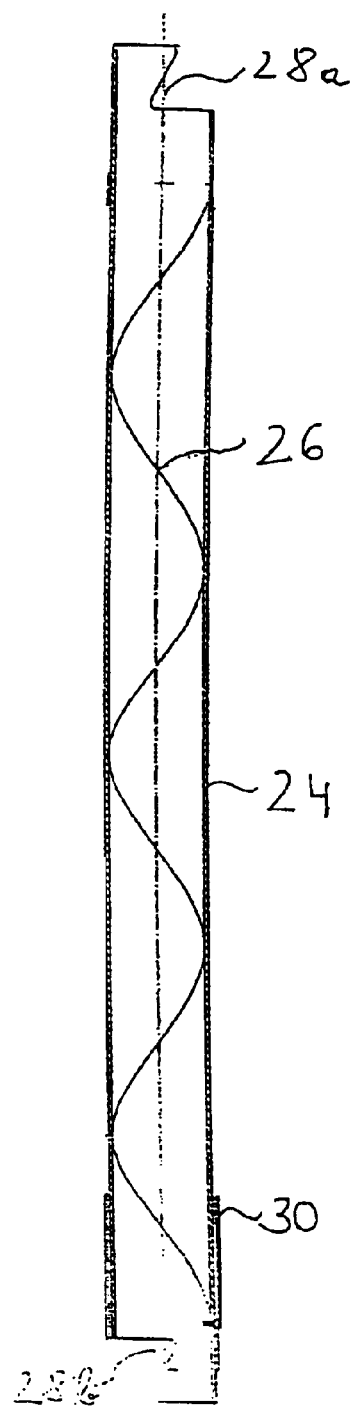
FIG. 2 shows an embodiment of the invention with a spirally formed body attached to the internal surface of the tube.

In order to control the amount of catalysts entering the loading-tube 22, the cross-section of which is illustrated in FIG. 2, a funnel system 2 (FIG. 1) is attached. System 2 is electrically vibrated by a vibrator. Catalyst particles being loaded into funnel 2 are continuously introduced into the loading tube 22 and thereby into the top tube 12 via funnel outlet 6 and gliding tube 8. Funnel system 2, when ready for loading is arranged on top of tube 12, such that gliding tube 8 fits into the loading tube 22, which in turn fits into the top tube 12 by sliding the system on sliding bar 10. The reactor tube 14 for catalytic reaction is arranged below the top tube 12.

The funnel system ensures the same high loading speed at all times during the loading operation.

The loading tube according to the invention is assembled by a number of tube sections 24 (FIG. 2). Each section is in a specific embodiment of the invention provided with a spirally formed body 26 as damper arranged on the inner wall of the tube section 24.

Tube sections 24 are assembled by connecting a number of sections to a final required length of the tube. The ends of the tube sections 24 are shaped in such a way that the end of one tube section fits into the following tube section like the components of a jig-saw puzzle, forming interlocking notches 28(a) and (b). When connected in this manner, where the tube sections have coinciding tube axes, the tube sections will be locked in both axial and rotational directions relative to each other.

Figure 3:
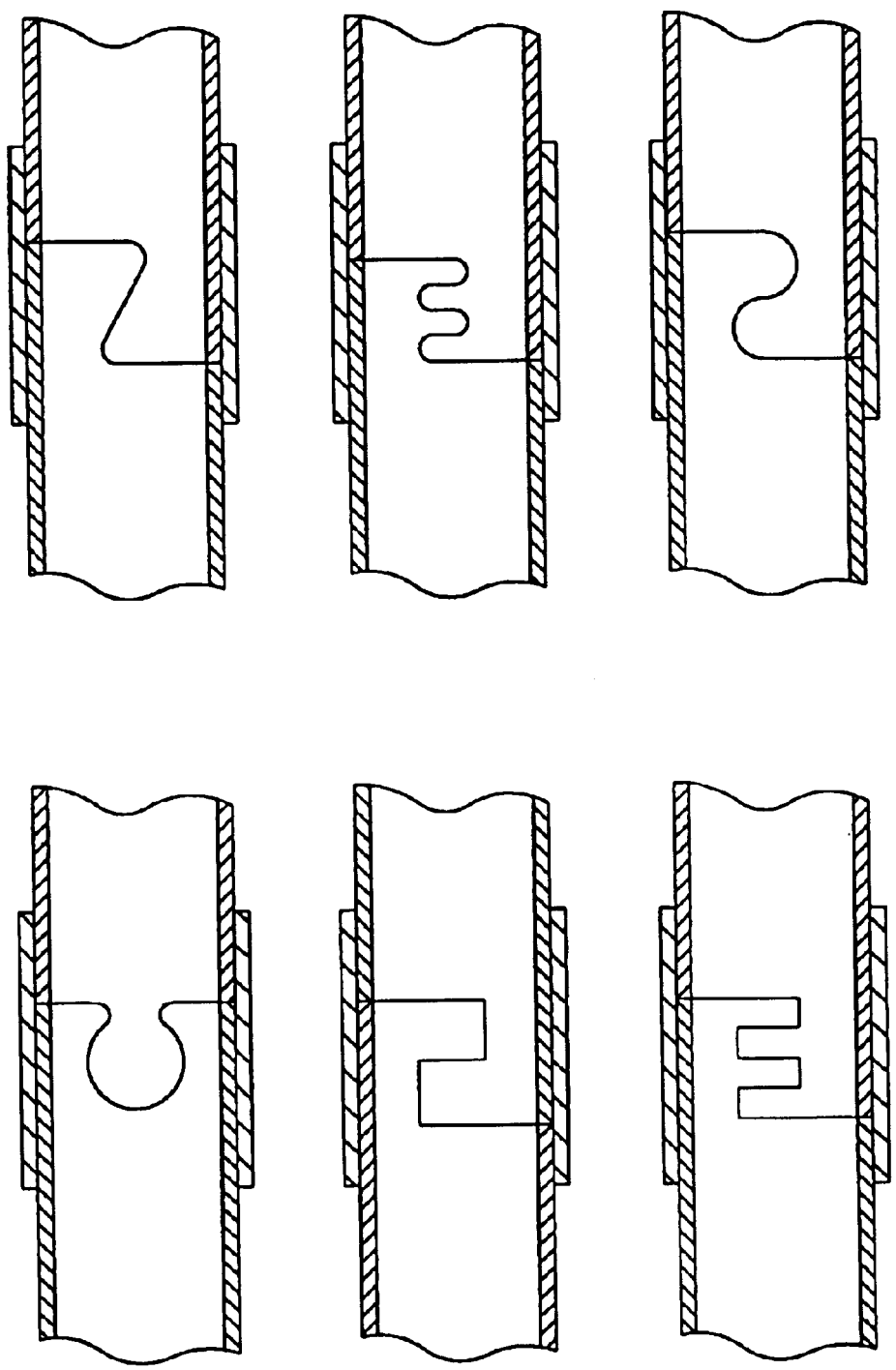
FIG. 3 shows examples of designs of the interlocking notches.

The interlocking notches 28 can have various designs as exemplified in FIG. 3.

To secure the coinciding tube axes, an outer encircling sliding member 30 with an inner diameter slightly larger than the outer diameter of the tube section, is placed in the area of the connection. The sliding member 30 can be formed as a thin-walled tube occupying minimum space outside the tube section 24 and no space inside the tube section. The connecting means are therefore very compact.

The damping means in the loading tube are provided by mounting a spirally formed body 26 on the inner wall of each tube section 24. The spirally formed body 26 is formed as a rod having an arbitrary cross section. The rod is in contact with the inner surface of each tube section 24 and it is formed as a spiral, making one full turn over a tube length equal to 2–8 times the tube section diameter. The pitch is consequently 2–8.

The rod has a maximum dimension in any direction of its cross-section of $1/25$–$1/2$ of the diameter of the tube section.

The rod can, for example, be of metal or plastic. However other materials that can be shaped as a spiral can be used.

When the catalyst is loaded through the loading tube, the speed of the catalyst particles will be reduced, as the catalyst will pass down through the loading tube on the spirally formed body. Furthermore, the vibrated funnel, the flow restriction on the funnel and the spirally formed body itself will ensure that the particles arrive singly and not in hobs to the bottom of the reactor.

The particles enter the loading tube with a horizontal velocity component. This prevents the particles from falling freely in the loading tube. If by chance the particles enter in lumps, the particles that do not initially fall on the spirally formed body contact the sides of the tube section until they finally fall on the spirally formed body and continue in a spiral movement. The loading tube of the invention thus ensures a constant, non-destructive, braking effect on the particles.

At the bottom of the loading tube, the catalyst particles will thereby all have the same speed and one by one fall a short, pre-defined distance. The result is uniform dense loading with no destruction of the catalyst particles.

The measured amount of particulate material to be loaded corresponds to a specific volume, which is proportional to the sectional area of, for instance, the tubular reformer multiplied by the height of the loading tube. This calculation allows for additional control of the loading process.

What is claimed is:

1. Method of loading particulate catalytic material into a reactor tube comprising providing a loading tube by connecting a number of tube sections having an outer diameter smaller than the inner diameter of the reactor tube, to a final tube length corresponding to the length of the reactor tube;

introducing at the top of the loading tube a quantity of the catalyst particles to be loaded into the reactor tube, causing the catalyst particles to pass through the loading tube in a damped motion by providing dampening means within the loading tube; and successively withdrawing the loading tube from the reactor tube in a length corresponding to the loading height of the catalyst particles loaded into the reactor tube, wherein the dampening means are provided by mounting a spirally formed body on the inner wall of each tube section, the spirally formed body being formed from a rod having an arbitrarily shaped cross-section and a maximum dimension in any direction of the cross-section of $1/25$–$1/2$ of the diameter of the tube section, the spirally formed body in each section having a pitch, with respect to the diameter of the tube section, in the interval of 2–8.

2. A loading apparatus for use in a loading method according to claim 1 comprising a loading tube having a tube diameter to fit into a reactor tube;

a top part of the loading tube being adapted to be connected to a funnel unit;

the loading tube consisting of separate tube sections each provided with connecting means adapted to be assembled to the loading tube when connected to each other;

at least one of the tube sections being provided with dampening means to decelerate the speed of catalyst particles being passed through the loading tube, wherein the dampening means are provided by mounting a spirally formed body on the inner wall of each tube section, the spirally formed body being formed from a rod having an arbitrarily shaped cross-section and a maximum dimension in any direction of the cross-section of $\frac{1}{25}-\frac{1}{2}$ of the diameter of the tube section, the spirally formed body in each section having a pitch, with respect to the diameter of the tube section, in the interval of 2–8.

3. Loading apparatus according to claim 2, wherein the means for connecting the tube sections comprises interlocking notches at the ends of the tube sections encircled by an outer sliding member.

* * * * *